United States Patent [19]
Gmeiner et al.

[11] 3,831,221
[45] Aug. 27, 1974

[54] WINDSHIELD WIPER INSTALLATION FOR VEHICLES

[75] Inventors: Günter Gmeiner; Erwin Kölle, both of Sindelfingen; Rudolf Binder, Schonaich, all of Germany

[73] Assignee: Daimler-Benz Aktiengesellschaft, Stuttgart, Germany

[22] Filed: Mar. 28, 1973

[21] Appl. No.: 345,496

[30] Foreign Application Priority Data
Mar. 29, 1972 Germany.......................... 2215335

[52] U.S. Cl. .......................................... 15/250.21
[51] Int. Cl. ............................................. B60s 1/26
[58] Field of Search........ 15/250.13, 250.21, 250.23, 15/250.29, 250.30, 250.39

[56] References Cited
UNITED STATES PATENTS
| | | | |
|---|---|---|---|
| 1,660,971 | 2/1928 | Lindner | 15/250.23 |
| 2,629,891 | 3/1953 | Greene | 15/250.23 |
| 3,729,766 | 5/1973 | Buchanan, Jr. | 15/250.21 |

FOREIGN PATENTS OR APPLICATIONS
1,162,324  4/1958  France.......................... 15/250.33

*Primary Examiner*—Peter Feldman
*Attorney, Agent, or Firm*—Craig & Antonelli

[57] ABSTRACT

A windshield wiper installation for vehicles, especially for motor vehicles, with a wiper arm adjustable in its effective length which is connected with a control plate pivotally secured at the vehicle by way of two levers forming a link quadrangle while the control plate is adapted to be set into to and fro pivot movements about its pivot axis by the wiper motor; two further levers are provided which are pivotally connected with each other for the control of the effective length of the wiper arm whereby the free end of one lever is pivotally secured at the wiper arm and the free end of the other lever is pivotally secured at the control plate; the free end of the other lever at the same time carries a pinion non-rotatably secured thereto which meshes with a toothed segment non-rotatably secured at the vehicle and coaxial with the control plate.

7 Claims, 3 Drawing Figures ized as 3,831,221

WINDSHIELD WIPER INSTALLATION FOR VEHICLES

The present invention relates to a windshield wiper installation for vehicles, especially for motor vehicles, whose wiper arm is adjustable in its effective length.

The requirement for as large as possible a wiper field which offers to the driver of a vehicle optimum visiility conditions, cannot be fulfilled by the presently customary windshield wiper installations because, in particular, the upper corners of the windshield are generally not covered by the wiper blades.

Consequently, windshield wiper systems have already been proposed heretofore with wiper arms or wiper blades adjustable in the effective length thereof which, however, by reason of their complicated structure and their susceptibility to troubles and failures could not find acceptance in practice up to the present.

The present invention is therefore concerned with the task to provide a windshield wiper installation which assures good visibility conditions to the driver, for example, of a motor vehicle and is thereby constructed in a simple and operationally reliable manner.

As solution to the underlying problems, a windshield wiper installation for vehicles, especially for motor vehicles, is proposed whose wiper arm is adjustable in its effective length whereby according to the present invention the wiper arm is connected with a control plate which is pivotally secured at the vehicle, by way of two levers under formation of a link quadrangle, which control plate is adapted to be set into a to and fro pivot movement about its point of pivotal connection by the wiper motor, and whereby two further levers pivotally connected with each other are provided for the control of the effective length of the wiper arm with the free end of one lever pivotally connected at the wiper arm and the free end of the other lever pivotally connected at the control plate, while a pinion which meshes with a toothed segment nonrotatably secured at the vehicle and coaxial to the pivot axis of the control plate, is also non-rotatably secured at the free end of the other lever.

Accordingly, it is an object of the present invention to provide a windshield wiper system for vehicles, especially for motor vehicles, which avoids by simple means the aforementioned shortcomings and drawbacks encountered in the prior art.

Another object of the present invention resides in a windshield wiper installation for vehicles, which fully satisfies the present day requirements for a field of vision which is as large as possible.

A further object of the present invention resides in a windshield wiper installation for vehicles which is capable to wipe also the upper corners of the windshield panes yet is simple in construction and substantially free of troubles.

Another object of the present invention resides in a windshield wiper system for vehicles which eliminates susceptibility to troubles and failures.

A further object of the present invention resides in a windshield wiper system for vehicles, especially for motor vehicles which creates optimum visibility conditions yet is extraordinarily reliable in operation.

These and further objects, features, and advantages of the present invention will become more apparent from the following description when taken in connection with the accompanying drawing which shows, for purposes of illustration only, one embodiment in accordance with the present invention, and wherein.

Figure 2:
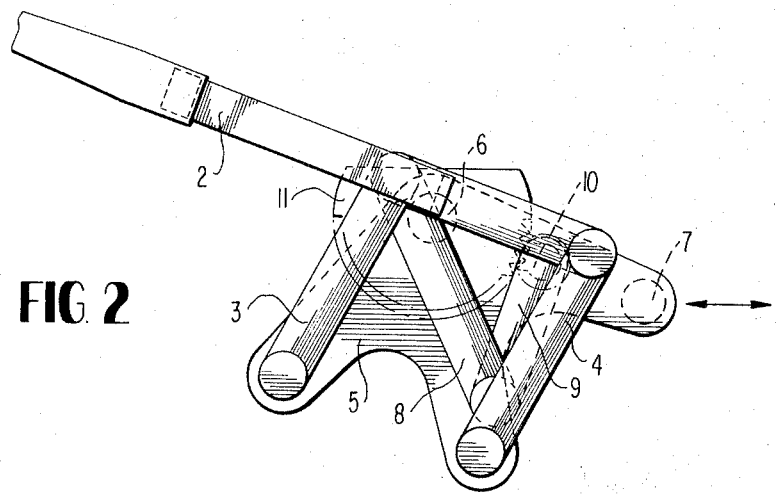
FIG. 2 is an elevational view, on an enlarged scale, of the drive linkage of the windshield wiper installation according to FIG. 2.
Figure 3:
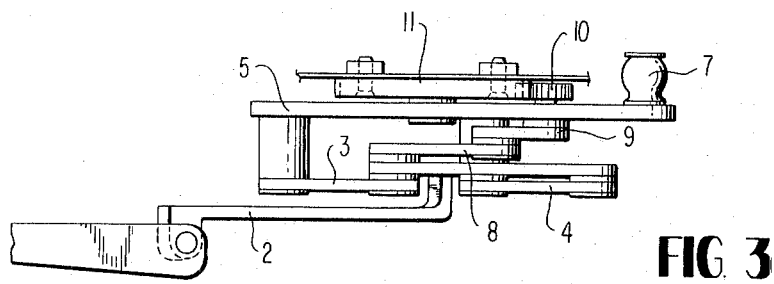
FIG. 3 is a plan view on the drive linkage according to FIG. 2.

Referring now to the drawing wherein like reference numerals are used throughout the various views to designate like parts, the windshield wiper blade 1 is readily detachably connected with the wiper arm 2 in a conventional manner, for example, by way of a plug-in connection of conventional type. The wiper arm 2 is operatively connected with a control plate 5 by way of two levers 3 and 4 which form a link quadrangle; the control plate 5, in its turn, is rotatably secured at the vehicle about the pivot pin 6. A ball head 7 (FIGS. 2 and 3) is provided at the control plate 5, to which is adapted to be connected a linkage (not shown) connected with a conventional windshield wiper motor (not shown) which imparts to the control plate 5 a to and fro pivot movement about the pivot pin 6.

In order to impart additionally a stroke movement to the wiper arm 2 during this to and fro pivot movement course, two further levers 8 and 9 are provided which are pivotally connected with each other whereby the free end of the lever 8 is pivotally connected at the wiper arm 2 and the free end of the other lever 9 is pivotally connected at the control plate 5. A pinion 10 is non-rotatably secured at the end of the lever 9 pivotally connected to the control plate 5, which pinion meshes with a toothed segment 11 that is coaxial to the control plate 5 and is non-rotatably connected with the vehicle.

Figure 1:
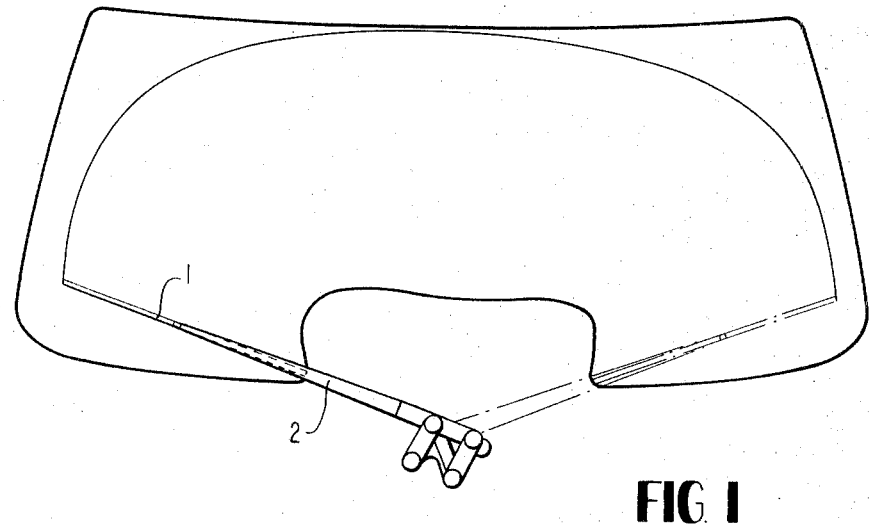
FIG. 1 is an elevational view of a windshield of a motor vehicle equipped with a windshield wiper installation according to the present invention.

Owing to such an arrangement, the wiper arm 2 and therewith also the wiper blade 1 carries out during the wiper operation, in addition to the usual pivot movement, also a stroke movement which results in the wiper field illustrated in FIG. 1. This is due to the fact that as the control plate 5 pivots to and fro about the pivot axis 6 as a result of the to and fro movement imparted thereto by the wiper motor, the pinion 10 fixedly connected with the free end of the lever 9 which itself is pivotally connected with the control plate 5, remains in meshing engagement with the toothed segment 11, causing a reciprocating movement of the wiper arm 2 by reason of the presence of the link quadrangle 3, 4 and the pivotal connection of levers 9 and 8. Of course, in case of two or more wiper arms per windshield, as known in the art, each wiper arm actuating mechanism may be constructed in accordance with the present invention. However, the large wiped area which can be realized by the present invention makes the same particularly suitable as single-blade or single-arm system arranged centrally of the windshield as shown in FIG. 1

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and

What we claim is:

1. A windshield wiper installation for vehicles which comprises a wiper arm means adjustable in its effective length, characterized by a control plate means pivotally secured at a relatively fixed part of the vehicle about a pivot axis and adapted to be set into to and fro pivot movements about its pivot axis, and means for imparting to said wiper arm means a pivotal movement during pivotal movement and of said control plate means as well as a predetermined displacement movement in the direction of its longitudinal axis including means operatively connecting said control plate means with said wiper arm means by a link-system and two lever means pivotally connected with each other, one of said two lever means being pivotally connected at its free end with the wiper arm means while the free end of the other lever means is pivotally connected at said control plate means, and further means operative between the free end of said other lever means and the relatively fixed part for causing said predetermined displacement motion during the to and fro pivotal movements of the control plate means.

2. A winshield wiper installation according to claim 1, characterized in that said further means includes a pinion non-rotatably secured near the free end of said other lever means, which meshes with a toothed segment non-rotatably secured at the vehicle.

3. A windshield wiper installation according to claim 2, characterized in that said toothed segment is coaxial to the pivot axis of the control plate means.

4. A windshield wiper installation according to claim 3, characterized in that said one lever means is longer than said other lever means.

5. A windshield wiper installation for vehicles according to claim 4, characterized in that the connecting means includes two levers of substantially similar length, which are each pivotally connected at one end with the control plate means and at the other end with the windshield wiper arm means, thus forming a link quadrangle.

6. A windshield wiper installation according to claim 1, characterized in that said one lever means is longer than said other lever means.

7. A windshield wiper installation for vehicles according to claim 1, characterized in that the connecting means includes two levers of substantially similar length, which are each pivotally connected at one end with the control plate means and at the other end with the windshield wiper arm means, thus forming a link quadrangle.

* * * * *